Figure 1:
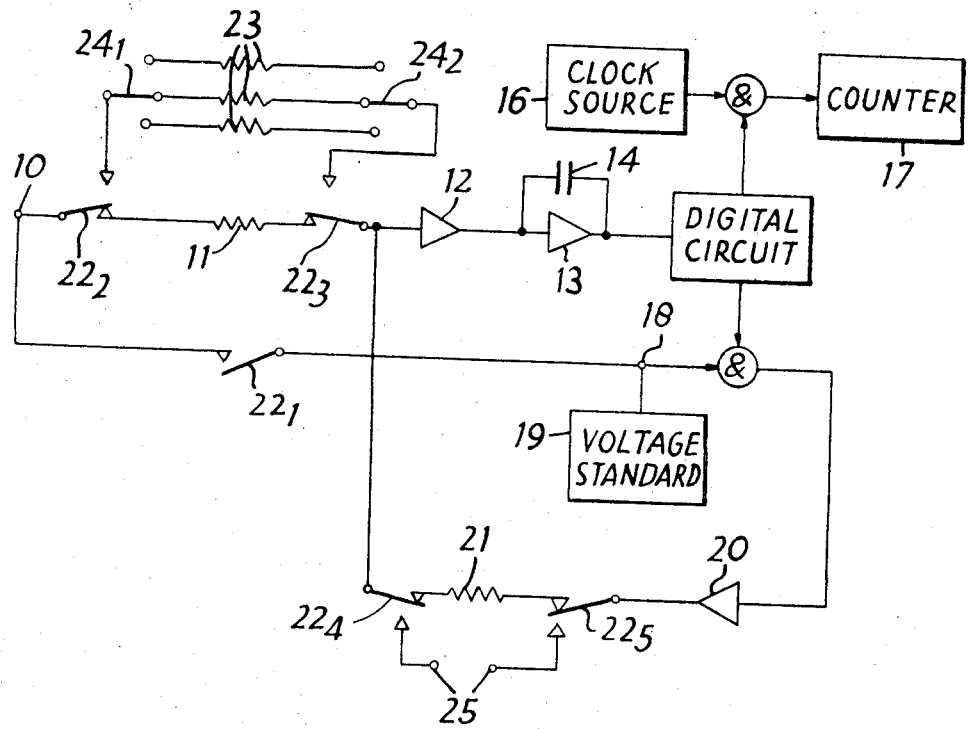

United States Patent [19]
Bloomfield

[11] 3,710,248
[45] Jan. 9, 1973

[54] MEASUREMENTS WITH DIGITAL VOLTMETERS

[75] Inventor: John Bloomfield, Farnborough, England

[73] Assignee: The Solatron Electronic Group Ltd., Farnborough, Hampshire, England

[22] Filed: Sept. 23, 1970

[21] Appl. No.: 74,725

[30] Foreign Application Priority Data

Sept. 26, 1969  Great Britain.....................47,483/69

[52] U.S. Cl..........324/99 D, 324/65 R, 340/347 AD
[51] Int. Cl.........................G01r 17/06, G01r 27/02
[58] Field of Search.......324/99 D, 99 R, 57 R, 65 R, 324/123 R; 340/347 AD

[56] References Cited

UNITED STATES PATENTS 3,051,939  8/1962  Gilbert.............................324/99 D

OTHER PUBLICATIONS

Kay et al.; "Twelve Functions"; Hewlett-Packard Journal; pages 2-13.

Primary Examiner—Rudolph V. Rolinec
Assistant Examiner—Ernest F. Karlsen
Attorney—William R. Sherman and Stewart F. Moore

[57] ABSTRACT

A digital voltmeter is adapted for measuring resistance by switching an internal reference voltage to the voltmeter input and switching the feedback resistor out of circuit. The unknown resistor is connected in place thereof. For measuring current the input resistor is removed from the input circuit.

4 Claims, 2 Drawing Figures

INVENTOR
John Bloomfield
ATTORNEY

MEASUREMENTS WITH DIGITAL VOLTMETERS

This invention relates to digital voltmeters arranged to enable measurements of resistance and/or current to be effected very simply. The invention is applicable to a digital voltmeter of the type (hereinafter called the type defined) which comprises a summing circuit whose input is connected to an input circuit to which a voltage to be measured is, in use, applied thereby to feed current into the summing circuit through a first resistor included in the input circuit, and whose output is connected to a control circuit which feeds an opposing reference current into the summing circuit through a second resistor to restore the output to a datum level and provides a digital measure of the total reference current.

The summing circuit preferably also smoothes or integrates the currents. As is well known it is thereby possible to reject series-mode noise. Such voltmeters are extremely well known in several variant forms. In some the voltage to be measured is applied in a first interval, after which the reference current is fed in, i.e., so called dual ramp voltmeters. In some the reference current is fed in during part of the time that the said voltage is applied. In some the reference current is continuous and in others it consists of a succession of pulses. All such variants may be used with the present invention.

In accordance with the invention in one aspect a digital voltmeter of the type defined is adapted for the measurement of resistance by the provision of switching means which, when operated, connects an internal voltage reference to the input circuit and disconnects the second resistor, connecting in place thereof terminals to which an unknown resistance can be connected. The first resistor can remain in the input circuit to serve as a standard resistor with which the unknown resistor is compared. Alternatively a different standard resistor can be switched in and provision can be made for changing this resistor to cover different ranges of resistance. If $R_s$ and $R_x$ are the standard and unknown resistance values respectively and N is the digital reading of the voltmeter, we have $R_x = Nk R_s$, where $k$ is a constant of proportionality which may be unity.

In accordance with the invention in another aspect, a digital voltmeter of the type defined is adapted for the measurement of current by the provision of switching means which, when operated, removes the first resistor from the input circuit. The second resistor can remain to pass the reference current or a different standard resistor can be switched in and provision can be made for changing this resistor to cover different current ranges. If the standard resistor is R the reference current is $v/R$, where is a constant and unknown current $I_x = Nkv/R$.

Two embodiments of the invention will be described by way of example with reference to the two block diagrams constituting FIGS. 1 and 2 of the accompanying drawings.

In FIG. 1 an input terminal 10 is connected to an input circuit consisting of a resistor 11 and an input amplifier 12 whose output is applied to an integrating circuit in the form of an operational amplifier 13 with a feedback capacitor 14. The output of the amplifier 13 is applied to a digital circuit 15 which can take one of several well known forms and gates clock pulses from a source 16 to a counter 17 and simultaneously gates a reference voltage, available on a terminal 18 from an internal standard 19, through an amplifier 20 and a resistor 21 to the input amplifier 12. Thus a reference current flows through resistor 21 and opposes the current flowing through the resistor 11. The counter 17 measures the time that the reference current flows, which is proportional to the unknown voltage applied to the terminal 10. As thus far described, the circuit and its operation are entirely conventional.

A set of ganged switches $22_1$ to $22_5$ is provided for switching the voltmeter from its conventional mode to a resistance measurement mode. When these switches are operated, (they are shown unoperated in FIG. 1), the terminal 18 is connected by switch $22_1$ to the terminal 10 to apply the reference voltage to the input circuit. Switches $22_2$ and $22_3$ remove the resistor 11 from the input circuit and put in its place whichever of three reference resistors 23 is selected by ganged selector switches $24_1$ and $24_2$. Finally switches $22_4$ and $22_5$ disconnect the resistor 21 and connect in its place whatever resistance exists between two terminals 25. These terminals are available on the outside of the instrument for connecting in an unknown resistance. The resistors 23 can have valves of R, 100R and 10,000R, for example. More or less than three reference resistors can of course be provided.

Figure 2:
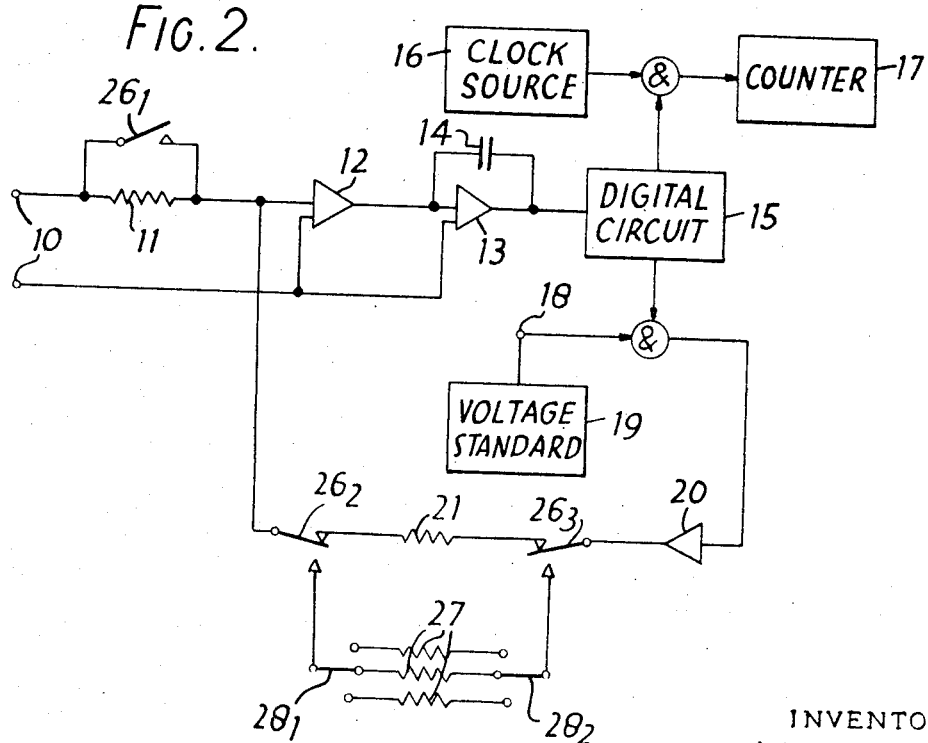

The voltmeter illustrated in FIG. 2 is identical with that in FIG. 1 so far as the conventional circuitry is concerned. In this case however a set of ganged switches $26_1$ to $26_3$ is provided for switching the voltmeter from its conventional mode to a current measurement mode. When these switches are operated, the input resistor 11 is shorted out by switch $26_1$ so that a current source can be connected to the terminals 10 to feed into the voltmeter a current to be measured. Switches $26_2$ and $26_3$ remove the resistor 21 from the feedback circuit and put in its place whichever of three reference resistors 27 is selected by ganged selector switches $28_1$ and $28_2$.

The facilities shown separately in FIGS. 1 and 2 can obviously be combined in a single instrument.

As illustrated the integrating circuit is a single integrator integrating the combined input and reference currents. Separate integrators can be provided however, the outputs thereof being combined or compared to provide

I claim:

1. A digital meter for selectively measuring voltage and resistance comprising a summing circuit, an input circuit to which an input voltage to be measured can be applied, said input circuit including a first resistor, the input circuit being connected to feed current resulting from said voltage into said summing circuit through said first resistor to cause the output of said summing circuit to ramp away from a datum level, a control circuit, circuit means connected between said control circuit and said summing circuit and including a second resistor, said control being responsive to said output of said summing circuit to feed a second current into said summing circuit through said second resistor in said circuit means in opposition to the first said current to drive said output toward said datum level, means in said control circuit for providing a digital measure of said second current, an internal voltage reference, terminals connectable to an unknown resistor, and switching means operable to a resistance measurement setting for connecting said voltage reference to said input circuit, disconnecting said second resistor and connecting said terminals in place thereof when operated to said setting.

2. A digital meter for selectively measuring voltage and resistance comprising
   a summing circuit,
   an input circuit to which an input voltage to be measured can be applied,
   said input circuit including a first resistor,
   the input circuit being connected to feed current resulting from said voltage into said summing circuit through said first resistor to cause the output of said summing circuit to ramp away from a datum level,
   a control circuit,
   circuit means connected between said control circuit and said summing circuit and including a second resistor,
   said control circuit being responsive to said output of said summing circuit to feed a second current into said summing circuit through said second resistor in said circuit means in opposition to the first said current to drive said output toward said datum level,
   means in said control circuit for providing a digital measure of said second current,
   an internal voltage reference,
   terminals connectable to an unknown resistor, at least one standard resistor, and switching means operable to a resistance measurement setting for connecting said voltage reference to said input circuit, switching said standard resistor in place of said first resistor, disconnecting said second resistor and connecting said terminals in place thereof when operated to said setting.

3. A digital meter according to claim 2, comprising means for selecting different standard resistors.

4. A meter according to claim 1 wherein said input circuit includes means for shunting said first resistor to permit measurement of current.

* * * * *